(12) United States Patent
Rodriguez (10) Patent No.: US 6,996,838 B2
(45) Date of Patent: Feb. 7, 2006

(54) SYSTEM AND METHOD FOR MEDIA PROCESSING WITH ADAPTIVE RESOURCE ACCESS PRIORITY ASSIGNMENT

(75) Inventor: Arturo A. Rodriguez, Norcross, GA (US)

(73) Assignee: Scientific Atlanta, Inc., Lawrenceville, GA (US)

( * ) Notice: Subject to any disclaimer, the term of this patent is extended or adjusted under 35 U.S.C. 154(b) by 731 days.

(21) Appl. No.: 09/879,307

(22) Filed: Jun. 12, 2001

(65) Prior Publication Data

US 2002/0199199 A1 Dec. 26, 2002

(51) Int. Cl.
*H04N 7/173* (2006.01)

(52) U.S. Cl. .......................................... 725/95; 370/474
(58) Field of Classification Search .................. 725/95, 725/90; 348/461; 375/240.01; 709/241; 370/474, 538; 345/535; 710/123

See application file for complete search history.

(56) References Cited

U.S. PATENT DOCUMENTS

| | | | |
|---|---|---|---|
| 5,844,620 A * | 12/1998 | Coleman et al. | 725/54 |
| 5,982,360 A * | 11/1999 | Wu et al. | 345/535 |
| 6,233,253 B1 * | 5/2001 | Settle et al. | 370/474 |
| 6,326,964 B1 * | 12/2001 | Snyder et al. | 345/419 |
| 6,477,562 B2 * | 11/2002 | Nemirovsky et al. | 718/108 |
| 6,608,625 B1 * | 8/2003 | Chin et al. | 345/501 |
| 6,766,407 B1 * | 7/2004 | Lisitsa et al. | 710/316 |
| 6,768,774 B1 * | 7/2004 | MacInnis et al. | 375/240.15 |

* cited by examiner

Primary Examiner—Gims Philippe (57) ABSTRACT

An embodiment of the present invention provides a system and method for adaptive resource access priority allocation. A method for adaptive resource access priority allocation includes determining whether a resource constrained mode is to be initiated, and responsive to a determination that the resource constrained mode is to be initiated, initiating the resource constrained mode, including modifying a resource access priority. For example, adaptive resource access priority allocation may include increasing the priority for graphical data transfer during intervals of high demand for memory and/or bus bandwidth resources.

34 Claims, 6 Drawing Sheets

SYSTEM AND METHOD FOR MEDIA PROCESSING WITH ADAPTIVE RESOURCE ACCESS PRIORITY ASSIGNMENT

CROSS-REFERENCE TO RELATED APPLICATIONS

This application claims the benefit of U.S. Utility application Ser. No. 09/736,661 filed on Dec. 14, 2000, which is hereby entirely incorporated herein by reference.

FIELD OF THE INVENTION

The present invention is generally related to managing resources, and more particularly related to decoding of compressed digital video under constrained resources.

BACKGROUND OF THE INVENTION

Video compression methods reduce the bandwidth and storage requirements of digital video signals in applications such as high-definition television, video-on-demand, and multimedia communications. Moreover, video compression is useful for transmission of broadcast, satellite, and cable television signals as evident in satellite up-link technology where multiple compressed digital video channels can be transmitted over one transponder instead of just one analog video channel.

Digital video compression methods work by exploiting data redundancy in a video sequence (i.e., a sequence of digitized pictures). There are two types of redundancies exploited in a video sequence, namely, spatial and temporal, as is the case in existing video coding standards. A description of these standards can be found in the following publications, which are hereby incorporated herein by reference: (1) ISO/IEC International Standard IS 11172-2, "Information technology—Coding of moving pictures and associated audio for digital storage media at up to about 1.5 Mbits/s—Part 2: video," 1993; (2) ITU-T Recommendation H-262 (1996): "Generic coding of moving pictures and associated audio information: Video," (ISO/IEC 13818-2); (3) ITU-T Recommendation H.261 (1993): "Video codec for audiovisual services at p×64 kbits/s"; (4) Draft ITU-T Recommendation H.263 (1995): "Video codec for low bitrate communications."

One of the most important standards developed by the Moving Pictures Expert Group (MPEG) is the MPEG-2 standard (ISO/IEC 13818-2). The video specification of MPEG-2 uses three predominant picture types: Intra frames (I frames), Predictive frames (P frames), and bi-directional frames (B frames). I frames are compressed by exploiting the internal spatial redundancy of each macroblock independently of reference pictures. The first picture of a picture sequence is an I frame. P frames are pictures in which macroblocks can be compressed by predicting their value from a past reference picture. A past reference picture is a picture, either an I or another P frame that is to be reconstructed and displayed prior to the current picture.

Information in past reference pictures is used to predict macroblocks in P or B frames. Each macroblock in a P frame potentially references a 16×16 pixel region in the reconstructed past reference picture. Thus a P frame demands more bus bandwidth to decompress than an I frame since the video decoder potentially needs to access data corresponding to a 16×16 pixel region or two 16×8 pixel regions from the reference picture stored in memory. P frames consume more memory to decompress than I frames since the past reference picture must be stored during decompression in memory.

If each macroblock in a 720×480 P frame is motion compensated and each pixel in memory is stored on average as 1.5 bytes, then at 30 pictures per second, the bus bandwidth requirement to retrieve 16×16 predictor blocks is 15,520,000 bytes per second. However, if each macroblock is encoded with two 16×8 block predictors, depending on the organization of data in memory, the bus bandwidth consumed is potentially doubled to 31,140,000 bytes per second. For Phase Alternate Line (PAL) compressed pictures more bus bandwidth is consumed since the picture resolution is 720×576.

If each macroblock in a 720×480 B frame is motion compensated, the bus bandwidth requirement to retrieve two 16×16 predictor blocks is 31,140,000 bytes per second. If each macroblock is encoded with four 16×8 block predictors, the bus bandwidth consumed is potentially doubled to 62,280,000 bytes per second. However, not all pictures in an MPEG-2 stream are B frames. For PAL compressed pictures more bus bandwidth is consumed since the picture resolution is 720×576. Each picture decompressed by the video decoder is written to a picture buffer in media memory. Thus, writing the reconstruction of each decompressed picture to memory consumes a bus bandwidth of 15,520,000 bytes per second.

Video decompression requires a relatively large amount of memory and use of other resources. Therefore, consumer devices such as television set-top devices that feature limited memory and bus bandwidth, for example, may not have the ability to present other media, such as high resolution graphics, simultaneously with video. As a result, the generation and display of media graphics are often compromised. For example, an electronic program guide that is presented along-side a reduced video screen may have to be generated and stored in memory at a lower spatial resolution and/or lower color bit-depth since there may not be enough memory and/or bus bandwidth resources to accommodate video decompression as well as a high resolution graphics presentation. As a result, there is a need for a system and method for managing resources of a video processing system in a more efficient and/or effective manner.

SUMMARY OF THE INVENTION

An embodiment of the present invention provides a system and method for adaptive video decoding. A method for adaptive video decoding includes determining whether a resource constrained mode is to be initiated, and responsive to a determination that the resource constrained mode is to be initiated, initiating the resource constrained mode, including modifying a resource access priority.

Other systems, methods, features and advantages of the invention will be or will become apparent to on with skill in the art upon examination of the following figures and detailed description. It is intended that al such additional systems, methods, features and advantages be included within this description, be within th scope of the invention, and be protected by the accompanying claims.

BRIEF DESCRIPTION OF THE DRAWINGS

Embodiments of the invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments, examples and implementations set forth herein. Rather, these non-limiting embodiments, examples and implementations are provided so that this disclosure will include at least some of the large scope of the present invention.

Figure 1:
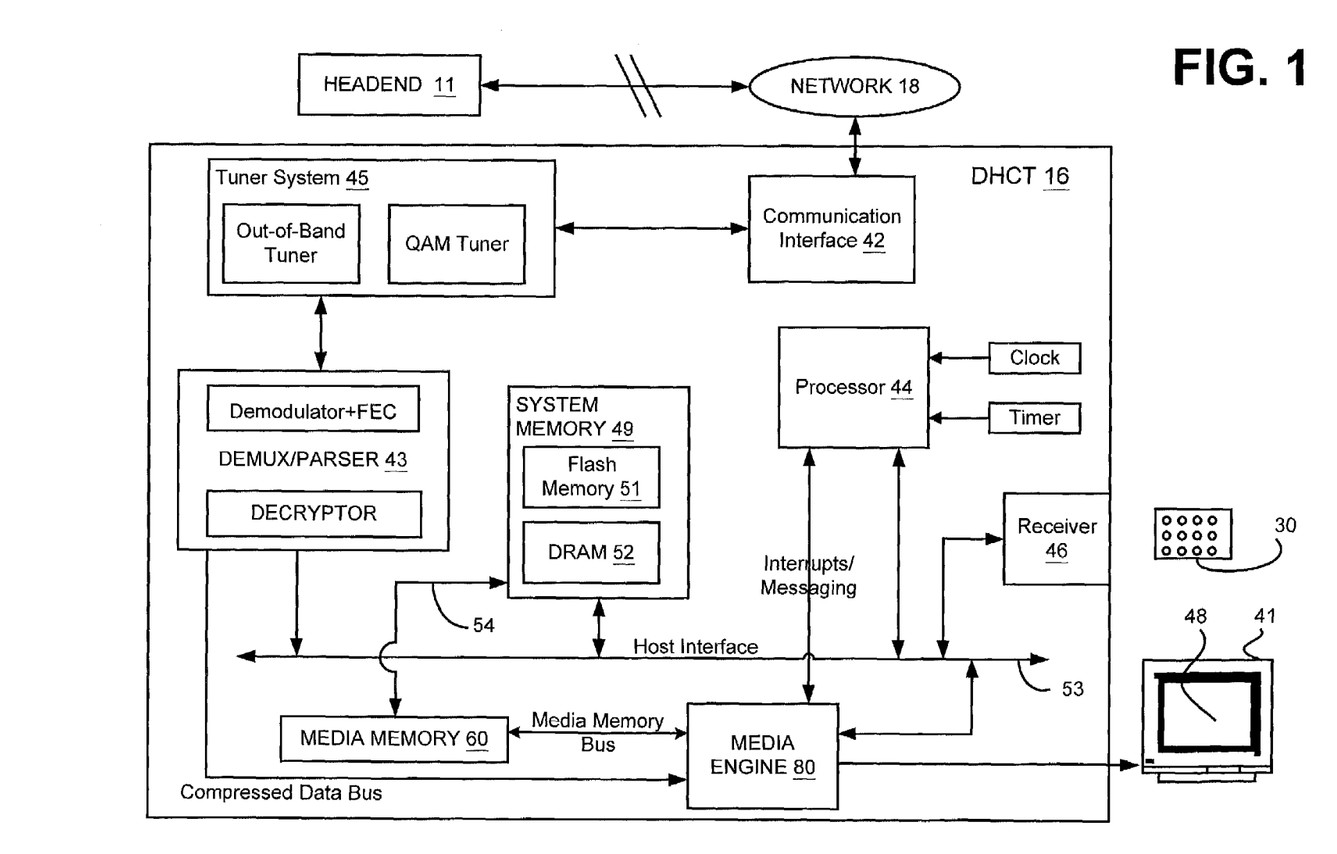
FIG. 1 is a block diagram of a DHCT and related equipment, in accordance with one embodiment of the present invention.

FIG. 1 is a block diagram illustrating a DHCT 16 that is coupled to a headend 11 and to a television 41 having a television display 43. Although some embodiments of the invention are illustrated in the context of a DHCT, the principles of the invention apply to video decompression in other contexts, such as, for example, in hand held multimedia devices. Some of the functionality performed by applications executed in the DHCT 16 may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through a network 18 and for providing any reverse information to the headend 11 through the network 18, as well as a demultiplexing system 43 comprising functionality for quadrature amplitude modulation (QAM) demodulation, forward error correction (FEC), transport demultiplexing and parsing, and decryption (if necessary). The DHCT 16 further includes at least one processor 44 for controlling operations of the DHCT 16, a media engine 80 for driving the television display 48, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a QAM tuner for receiving television signals. Additionally, a receiver 46 receives externally-generated information, such as user inputs or commands from other devices.

Communication and coordination between the media engine 80 and processor 44 is conducted through a host interface 53. In addition to the typical data and address buses that connect processor 44, media engine 80 and system memory 49, the host interface 53 may contain physical interrupt lines and/or internal addressable registers that can be polled periodically by an embedded RISC processor 100 (FIG. 3) or a micro-controller or similar circuitry housed in media engine 80. The processor 44 may also be signaled by the media engine 80 through physical interrupt lines and/or read-write message registers that are not part of the host interface 53.

Under control of software applications executing from system memory 49, the Processor 44 generates graphical and textual data and stores them in system memory 49. The textual and graphical data may for example be generated through the execution of an electronic program guide (EPG) application for the purpose of presenting a user with an EPG window. After generating graphical and/or textual objects, the processor 44 then notifies the media engine 80 through the host interface 53 of the pending data that is to be transferred to media memory 60. The processor 44 may, in one embodiment, use a DMA (direct memory access) channel 54 to transfer the data to media memory 60 upon an access entitlement by media engine 80's memory controller 98. DMA channel 54 may be controlled by one of a plurality of devices with memory accessing capabilities, such as processor 44, or a system memory controller (not shown).

The processor 44 runs an operating system capable of multi-tasking, task scheduling and switching. In a preferred embodiment, the processor 44 runs a pre-emptive real-time operating system. The processor 44 can be notified by media engine 80 via interrupts or messages written to registers when processor 44 is entitled access to media memory 60. A background task is executed to poll messages on a periodic basis. The processor 44 may postpone a current task in order to transfer data from system memory 49 to media memory 60. Small sets of contiguous memory locations are read rapidly from system memory 49 and stored in first-in-first-out memory (FIFO) 92 and 95 (FIG. 3) in the media engine 80.

Graphics and textual data may, in one possible implementation, be transferred from system memory 49 to media memory 60 during the intervals when the media engine 80 is not decoding a video picture. A period of not decoding video pictures may consist of foregoing the decompression of one or more compressed video pictures residing in compressed format in media memory 60. Thus, the communication and coordination between media engine 80 and processor 44 enables better use of bus bandwidth during periods wherein picture decompression is skipped.

In one implementation, one or more media engine 80 operations may, under some circumstances, be assigned higher priority access to media memory 60 than any data transfer operation from system memory 49 to media memory 60. Therefore, graphical and textual data produced by the processor 44 may have limited bus access to media memory 60.

Figure 2:
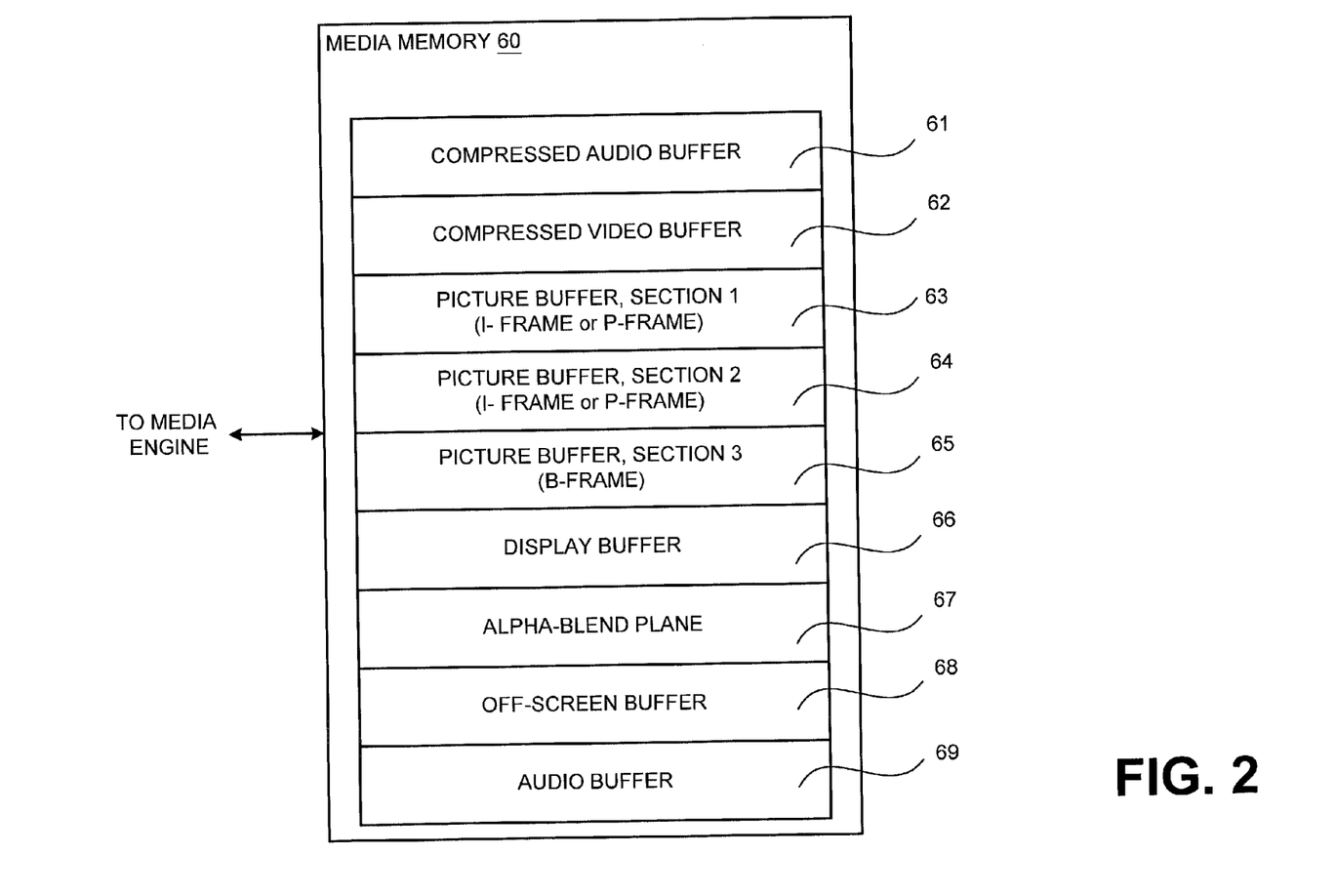
FIG. 2 is a block diagram depicting media memory contents of the DHCT depicted in FIG. 1.

Communication aimed at transferring data from system memory 49 to media memory 60 requires specifying the data to be transferred, including the number of data sets and total number of bytes to be transferred. Each data set occupies a rectangular region to be copied within the confines of the display buffer 66. Thus, a data set specification includes the location of the top-left pixel of a rectangle in relation to the top-left pixel of the graphics overlay, the number of bytes in each horizontal line of the rectangle, and the number of lines in the rectangle.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and be transferred into DRAM 52 for execution. Likewise, data input for an executable program can reside in flash memory 51 or a storage device and be transferred into DRAM 52 for use by an executable program or algorithm. In addition, data outputted by an executable program can be written into DRAM 52 by an executable program or algorithm and be transferred into flash memory 51 or into a storage device for storage purposes.

FIG. 2 is a block diagram illustrating an example media memory 60 that is used for storing various types of data. Sections of media memory 60 include a compressed audio buffer 61, a compressed video buffer 62, picture buffers 63–65, a display buffer 66, an alpha blend plane 67, an off-screen buffer 68, and an audio buffer 69. Compressed MPEG-2 video streams and compressed digital audio streams are stored in the compressed video buffer 62 and the compressed audio buffer (CAB) 61, respectively. The audio buffer (AB) 69 stores decompressed audio that is to be fed into the audio digital-to-analog converters (DACs, not shown). Each of the picture buffers 63–65 has a capacity equal to the number of bytes in a reconstructed MPEG-2 Picture. One picture buffer may store a past reference picture (such as an I frame), a second picture buffer may store a future reference picture (such as a P frame) and a third picture buffer may store a picture that is currently being decompressed (such as, for example, a B frame).

A display buffer 66 may contain graphical and textual data produced by the processor 44 as well as downscaled digital video data. The content of the display buffer 66 (also referred to as the graphics overlay) may be overlaid on top of a video picture. An alpha-blend-plane stores pixel values that correspond spatially to respective pixel data in the graphics overlay. A pixel value in the alpha-blend-plane indicates (according to an alpha value) the extent to which a corresponding "pixel" in the display buffer 66 will be opaque. In other words, the values in an alpha-blend-plane determine the extent to which a graphics overlay is translucent. For example, the alpha-blend-plane may contain values corresponding to a graphics overlay containing a broadcasting company's logo, where high alpha values would cause the logo to appear opaque and intermediate alpha values would cause the logo to appear translucent. The color depth and spatial resolution employed for the graphics overlay affect the number of bytes and bus bandwidth consumed by the display buffer and alpha-blend-plane.

Figure 3:
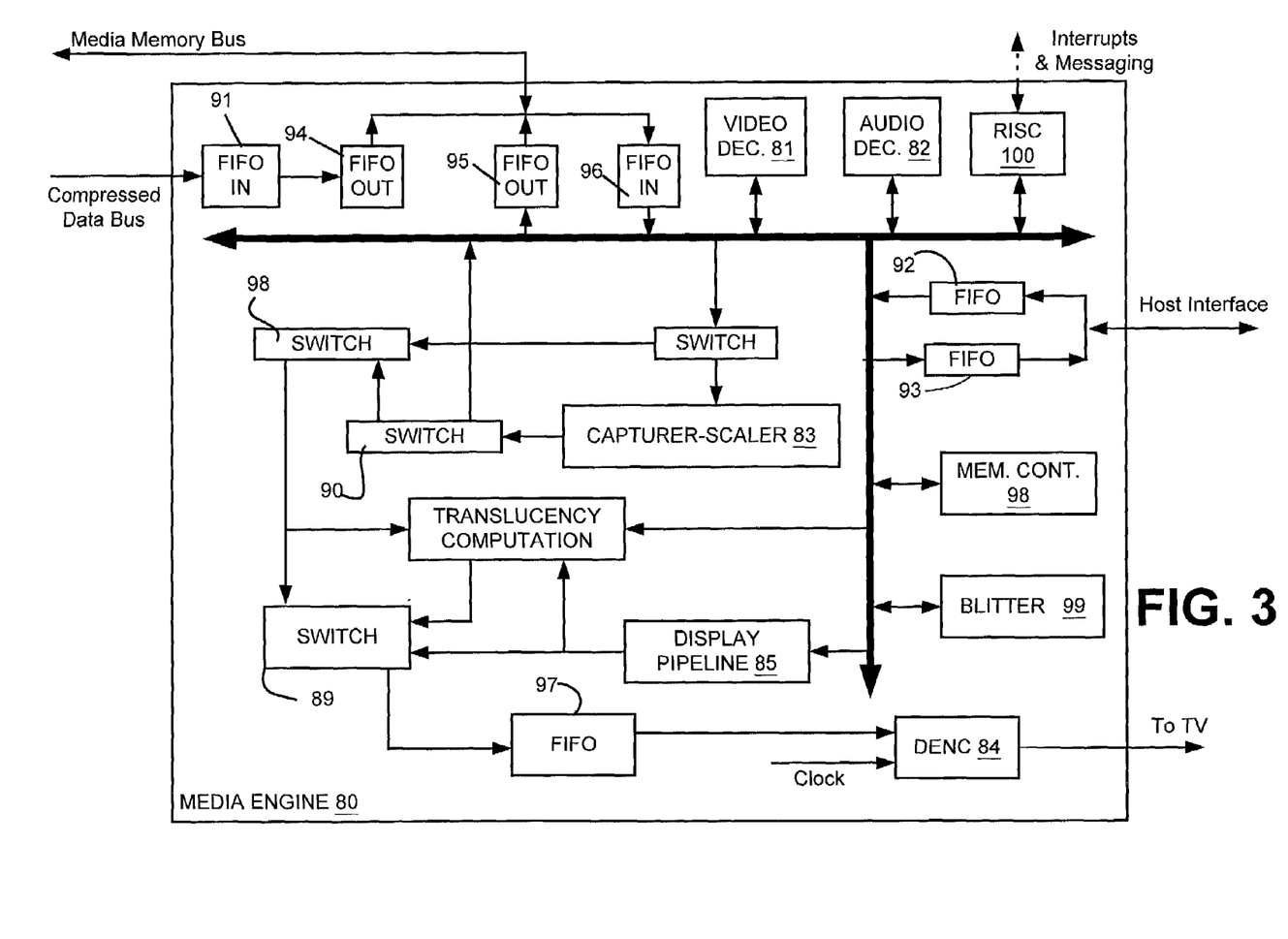
FIG. 3 is a block diagram of a media engine of the DHCT depicted in FIG. 1, in accordance with an embodiment of the present invention, including data flow and interconnections.

External operations (e.g., by a processor 44) deposit the compressed MPEG-2 video stream and compressed audio streams respectively into the compressed video buffer 62 (CVB) and compressed audio buffers 61 (CAB). The CVB 62 and CAB 61 are circular buffer entities filled by external operations and consumed respectively by the video decoder 81 and audio decoder 82 (FIG. 3). Each compressed MPEG-2 video picture in the CVB 62 is specified compliant to the video syntax and semantics rules of the MPEG-2 standard, as would be understood by one reasonably skilled in the art. Information specified according to the MPEG-2 video stream syntax at the picture level of each compressed picture is read by a video decoder 81 (FIG. 3), even when a picture's decompression is to be skipped over. For instance, information specified within the picture header and the picture coding extension is interpreted for each picture. In this manner, the video decoder 81 determines the number of bytes to jump to in the CVB 62 to find the start of the next compressed video picture. Other pertinent information in the picture level specification of each picture is also interpreted as necessary during video decoder 81 operations.

With additional reference to FIG. 2, FIG. 3 is a block diagram depicting selected components of an example media engine 80. The media engine 80 may be, for example, an application specific integrated circuit (ASIC). In the example illustrated in FIG. 3, media engine 80 includes a video decoder 81 for decoding compressed digital video, an audio decoder 82 for decoding compressed digital audio, a block transfer engine, or "blitter" 99, for transferring graphical and textual data from system memory 49 to media memory 60, a video capturer-scaler 83 for resizing video pictures, and a programmable memory controller 98 for controlling access to the media memory 60. In one implementation, an embedded RISC processor 100 or similar circuitry is located in the media engine 80 and is coupled to the memory controller 98. The embedded RISC processor 100 may control various components in the media engine 80 and may coordinate communication and control with processor 44 by servicing and generating interrupts.

In a preferred embodiment, the functional components that consume media memory bus bandwidth may include: the video decoder 81, the audio decoder 82, the blitter 99, the video capturer-scaler 83, a video digital encoder 84 (DENC), one or more video DACs (not shown), one or more audio DACs (not shown), the processor 44, an embedded RISC processor 100 or a micro-controller or similar circuitry, and the memory controller 98. The RISC processor and the memory controller 98 typically consume negligible bus bandwidth but indirectly fulfill memory-to-memory data transfer operations by servicing first-in-first-out buffers (FIFOs) 91–97. The FIFOs 91–97 serve as intermediate repositories for data transfers that facilitate burst data transfers and coordination of bus access timing.

FIFOs 92 and 95 act as a double bank repository of storage to effect a transparent data transfer when the host interface and media memory data bus run off two distinct clocks. In an alternative implementation, the host interface 53 and the media memory data bus run off the same clock signal such that FIFOs 92 and 95 may comprise a single contiguous physical FIFO.

Media engine 80 transfers FIFO content to a designated area of display buffer 66. As data written to the FIFO is transferred to media memory 60 from FIFO 95, the processor 44 initiates the next burst transfer into the FIFO 92. The process is repeated until all data corresponding to the data sets is transferred. Through this transfer process, media engine 80 and processor 44 may, in one possible implementation, arrange for the transfer of data from system memory 49 into the display buffer 66 in the media memory 60 during times when the video decoder 81 is foregoing the decoding of B frames.

In one implementation of media engine 80, when the processor 44 notifies media engine 80 via interrupts or messages that data sets are ready to be transferred from system memory 49 to media memory 60, the media engine 80 employs a blitter 99 to transfer the data sets. Immediately prior to initiating the data transfer operation, the media engine 80 notifies the processor 44 that the blitter 99 is about to transfer data. The processor 44's access to system memory 49 may be awarded lower priority during the blitter 99 transfer. Alternatively, processor 44 may refrain from accessing system memory 49 until future communication from media engine 80 indicates that the data transfer has been completed. Thus the media engine 80 takes higher precedence over system memory 49 access during blitter 99 data transfers from system memory 49 to media memory 60.

The blitter 99 reads small sets of contiguous system memory 49 locations rapidly and stores them in media engine 80's FIFOs 92 and 95. The FIFO's content is written to the designated area of the display buffer 66 while the FIFO is replenished with data read from system memory 49. This operation continues until all data corresponding to the data sets is transferred. When the blitter 99 operation terminates, the media engine 80 notifies processor 44 to re-establish its higher priority access to system memory 49. It should be noted that the prioritization of access to system memory 49 is not to be confused with the prioritization scheme exercised by the memory controller 98 in media engine 80 for access to media memory 60.

The memory controller 98 grants access to data transfers from system memory 49 to the display buffer 66 in a timely way that protects against the appearance of tear artifacts on the TV display 48. Data transfer is granted to locations in the display buffer 66 corresponding to raster-scan ordered data already fed from display buffer 66 into the DENC 84. In other words, data written to the display buffer 66 is always behind (in raster-scan order) the display buffer 66 locations read and fed into the DENC 84. Alternatively, data can be written to a secondary display buffer 66, often called an off-screen buffer 68. However, this approach consumes additional media memory 60 and further limits the video decoder 81's resources. The off-screen buffer 68, or parts thereof, are then transferred to the display buffer 66 using the blitter 99 during suitable times (e.g., during the vertical blanking video interval).

In one implementation, the memory controller 98 helps the display buffer 66 and the off-screen buffer 68 to alternate their functions, thereby conserving bus bandwidth. The memory controller 98 uses a pointer that points to the beginning of the display buffer 66 and another pointer that points to the beginning of the off-screen buffer 68. Both pointers are stored either in memory or in special registers in the media engine 80. Therefore, to alternate the functions of the two buffers 66 and 68, the content of the two pointer repositories are swapped under program control. Thus after the offscreen buffer 68 receives all data sets that comprise a display buffer 66 update, the offscreen buffer acts as a display buffer and the display buffer acts as an offscreen buffer.

The DENC 84 converts reconstructed picture data received at its input to an analog video signal that drives the TV display 48. The process of feeding the reconstructed picture data from media memory 60 to the DENC 84 is a media-consuming operation; it is typically assigned high (if not highest) priority access to the media memory 60 to avoid flicker on the TV display 48. Likewise, the audio DAC and all other media-consuming operations are typically assigned high priority.

The DENC 84 receives data from media memory 60 in a manner that results in a raster scan of displayed pixels consistent with the type of television connected to the DHCT 16. For an NTSC Display, the DENC 84 receives 60 fields per second; each field belongs to one of two sets of alternating lines in each picture. According to the MPEG-2 standard's "Main Profile/Main Level," the DENC 84 can receive the equivalent of up to 30 pictures per second, each picture with spatial resolution equal to 720×480 pixels, with each pixel requiring an average of 1.5 bytes. Thus maintaining the TV display 48 refreshed results in bus bandwidth consumption of 15,520,000 bytes per second.

In alternative implementations, either the video DENC 84 or audio DAC, or both, may be "external to" or "housed within" the media engine 80. In other embodiments, there are multiple sets of video DENC 84s and audio DACs wherein each set is fed reconstructed digital media corresponding to different MPEG-2 programs. Furthermore, any of the aforementioned functional components may either be located within or outside media engine 80.

The media engine processes input data from media memory's display buffer 66 and picture buffer 30 according to information retained in the alpha-blend plane 67, and provides output data to the DENC. Data from the display buffer 66 and data from the picture buffer 30 are stored in temporary repository memory (not shown) so that they may be readily provided to the input of 3-way output switch 89 at the clocked pixel rate required for display. The temporary repository memory may be, for example, line buffers (not shown) or FIFOs (not shown) inside media engine 80.

The alpha-blend plane 67 is read and stored in temporary repository memory inside media engine 80 so that it is readily-available. If the pixel value in the display buffer 66 denotes a transparent graphics pixel, the 3-way output switch 89 is set accordingly to propagate to its output a first input corresponding to a video pixel that is read from the picture buffer 30 and displayed as pure video. If the pixel in the alpha-blend-plane denotes a value for opaque graphics, then the 3-way output switch 89 is set accordingly to transfer to its output a second input corresponding to a graphics pixel such that the pixel displayed is read from the display buffer. Otherwise, if the pixel in the alpha-blend-plane denotes a value for translucent graphics, a translucent pixel value is computed immediately prior to arriving to the third input of the 3-way output switch 89 in the display pipeline 85. Such computation is a weighted-average of the values of the spatially corresponding graphics and video pixels according to an alpha value stored in the corresponding location of the alpha-blend-plane.

In alternative implementations, the alpha-blend plane 67 may not exist as an independent entity but may be part of the formatted specification of each pixel in the graphics information. Thus pixels comprising a graphics overlay in the offscreen buffer 68 and display buffer 66 may contain their respective alpha-blend value.

Figure 4:
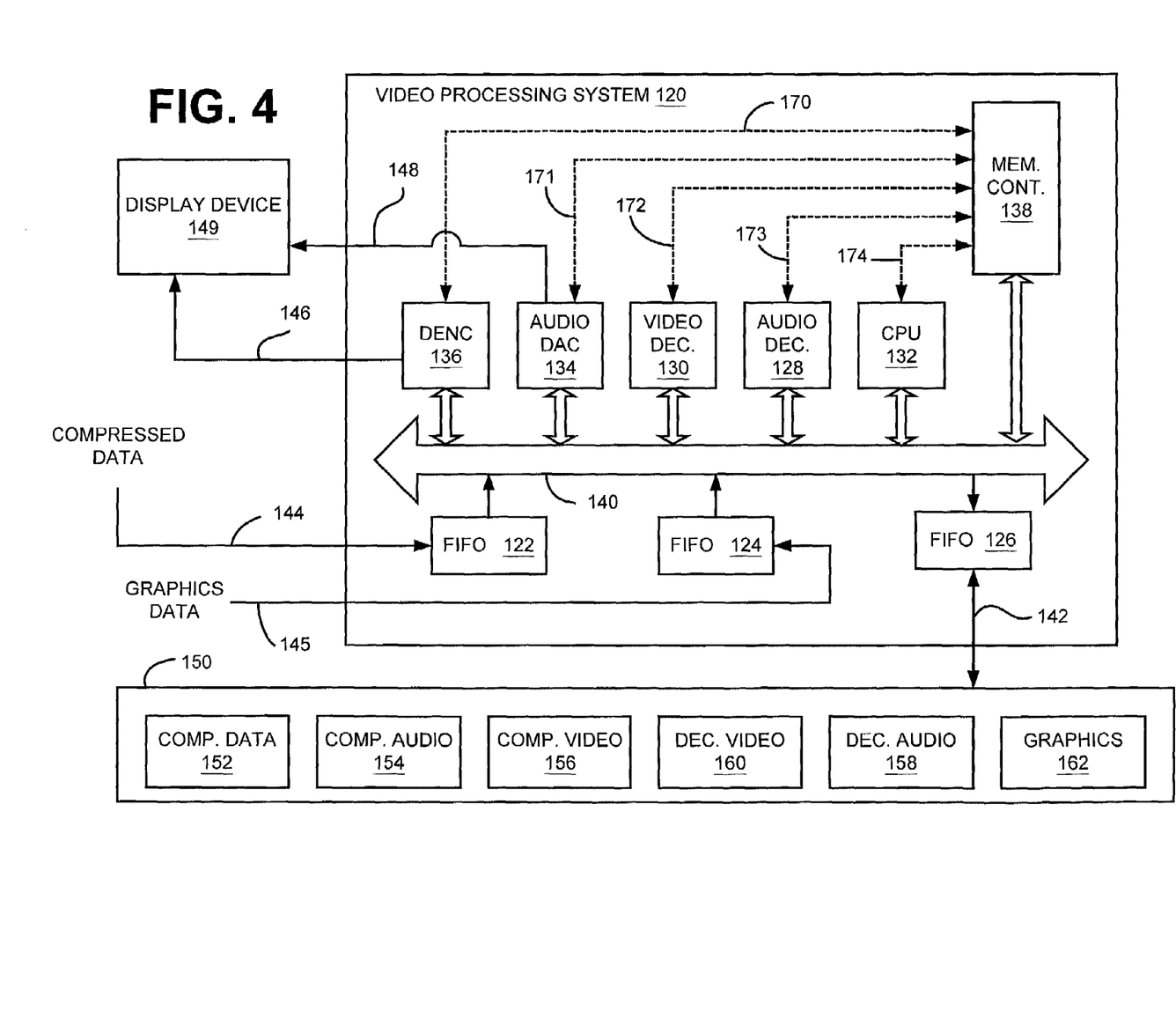
FIG. 4 is a block diagram depicting a video processing system in accordance with an embodiment of the present invention.

Embodiments of the present invention may also be implemented in video processing systems other than DHCTs. FIG. 4 is a block diagram depicting, in part, a video processing system 120 in which an embodiment of the present invention may be implemented. Video processing system 120 may be part of, for example, a multimedia telephone, or some other device that provides video imaging in conjunction with graphical and/or textual data. The video processing system 120 operates to decompress compressed video data in cooperation with media memory 150 and to provide audio, video, graphical, and/or textual data that is formatted for display via display device 149. In this non-limiting example, the memory blocks in the media memory 150 are physically separate from the video processing system 120. In an alternative embodiment, one or more memory blocks shown in media memory 150 may be contained in the video processing system 120.

Video processing system 120 includes a CPU 132, an audio decoder 128, an audio DAC 134, a video decoder 130, a DENC 136, and a memory controller 138. These video processing system components (VPSCs) are coupled to data bus 140 which provides access to media memory 150 via a FIFO 126 and a connection 142. Media memory 150 is accessed by VPSCs of the video processing system 120 in order to convert the compressed data received via connection 144 into video and audio signals that are formatted for a television display, and that are transmitted via connections 146 and 148, respectively, to a display device 149.

The CPU 132 may be a microprocessor or micro-controller that executes a prioritization routine for coordinating the operation of the VPSCs in the video processing system 120. Once the routine is started, the CPU 132 coordinates all the VPSCs in a preprogrammed priority scheme that allows each of the VPSCs to access the media memory 150 when required under control of the memory controller 138. A VPSC may access media memory 150 via data bus 140 after receiving authorization from memory controller 138.

Memory controller 138 ensures that VPSCs gain access to data bus 140 in an orderly manner. Each of the VPSCs may be connected to the memory controller 138 via a control signal line. These control lines 170–173 facilitate the control of each of the VPSCs' access operations to media memory 150.

Compressed data received via connection 144 is stored in the compressed data buffer 152 of media memory 150. This process is performed in coordination with memory controller 138. In one embodiment, the CPU 132 may be responsible for demultiplexing compressed data into audio data, video data and other data segments. The other data segments may be, for example, data that is used for complying with the MPEG standard. After the CPU 132 demultiplexes data retrieved from the compressed data buffer 152, it stores the resulting compressed audio and video signals in the compressed audio buffer 154 and the compressed video buffer 156, respectively.

Under the arbitration of the memory controller 138, the audio decoder 128 and the video decoder 130 decode the compressed audio and video signals stored in buffers 154 and 156, respectively, to obtain the corresponding audio and video data in an uncompressed format. The uncompressed audio and video data are stored in the decoded audio buffer 158 and the decoded video buffer 160, respectively. The process of decoding is coordinated by memory controller 138 such that each of the decoders 128 and 130 obtains authorization every time that the respective decoder imports data from or exports data to media memory 150. In this manner, only one VPSC has access to data bus 140 at any given time.

Data stored in the decoded audio buffer 158 and the decoded video buffer 160 may be retrieved by the DENC 136 and the audio DAC 134, respectively, under the arbitration of the memory controller 138. The DENC 136 may provide a video output via connection 146 while the audio DAC 134 may provide an audio output via connection 148. The video output is formatted by the DENC 136 in accordance with the type of display device that is receiving the video output. Possible video formats include NTSC and PAL.

Constrained-Resource States

There may be multiple levels of constrained resources; some scenarios may exhibit limits on both memory and bus bandwidth, while others may exhibit either memory limitations or bus bandwidth limitations, but not both. In a non-constrained-resource-state, a high priority access to resources assigned to the video decoder 81 results in non-compromised picture quality, full-scale video picture and full picture rate, but the graphics overlay is potentially compromised. For example, the graphics overlay may be maintained with reduced spatial resolution and/or color depth but expanded to the video picture resolution on the way to the DENC 84 in a display pipeline circuit 85 in the media engine 80 (FIG. 3). This results in reduced number of bytes and bus bandwidth consumed by operations that access the display buffer 66 and alpha-blend-plane. The expansion of the graphics overlay's resolution is achieved by a Horizontal Picture Scaling Circuit (not shown) and a Vertical Scaling Picture Circuit (not shown), both located within the Display pipeline 85. Line buffers inside the display pipeline 85 or elsewhere in the media engine 80 serve as temporary repository memory to effect the scaling operations.

A "memory" constrained-resource state may result in the video decoder 81 consuming less memory. For decompression of a compressed MPEG-2 video, memory reduction may result from eliminating decompression and reconstruction of B frames. This facilitates having to maintain a picture buffer with two rather than three sections in media memory 60; one section is used to store the past reference picture and the second to reconstruct the picture being decoded. Thus, the video decoder 81 decompresses only the I and P frames when there is insufficient memory to store all of the reference pictures. A decompression frame sequence could potentially be: $F_1, F_4, F_7, F_{10}, F_{13}, \ldots F_k$. The interspersed compressed B frames can be skipped because they do not serve as reference pictures. A preceding reference frame may be displayed in place of a skipped B frame such that a displayed frame sequence may be: $F_1, F_1, F_1, F_4, F_4, F_4, F_7,$ $F_7, F_7, F_{10}, F_{10}, F_{10}, \ldots F_k$. The memory resources freed up by foregoing the decompression of B frames may then be allocated for storing other data such as graphical or text data.

In a "memory and bus bandwidth" constrained-resource state and "memory" constrained-resource state, the video decoder 81 may produce video pictures at lower rates whereas the graphics overlay is maintained with a higher spatial resolution and/or color depth. The video decoder 81 can produce video pictures at lower rates by foregoing the decompression and reconstruction of selected frames such as, for example, B frames. By foregoing the decompression of B frames, the video decoder 81 can relinquish the section of the picture buffer used to store the B frame. This section may then be assigned in whole, or in part, for the benefit of the graphics overlay and alpha-blend-plane data. As a result, either the graphics overlay or the alpha-blend-plane, or both, are represented in memory with a higher spatial resolution and/or color-depth. Furthermore, the bus bandwidth that would have been consumed in decompressing and reconstructing the B frames may instead be used for transporting graphical and textual data.

One common cause of a resource-constrained state is applications that display a downscaled video picture that appears as an embedded picture in a graphical color screen. In essence, viewer interaction may cause the display to enter a computer-like media presentation. Once the constrained-resource-state is invoked, the video decoder 81 may adapt to constraints on memory and bus bandwidth. Adaptation is not necessarily fixed but may be dynamically adjusted. Thus the video decoder 81 may decode compressed digital video pictures according to the bus bandwidth requirements of the other media-producing operations. In a preferred embodiment, the video decoder 81 decompresses MPEG-2 video streams that were compressed without any consideration to the possibility of subsequent reduction in the picture rate and/or the spatial resolution of images in the streams.

A system of the preferred embodiment of the invention offers a balance between video picture quality and quality of graphics and textual objects by alternating between two or more resource-allocation states. Full-scale, full-rate video picture playback with potentially (i.e., not necessarily) compromised graphics quality may be provided during passive television viewing. However, when a viewer initiates interaction with the DHCT 16 (FIG. 1) that demands the display of a composition of a downscaled picture resolution with graphical and textual objects, the viewer is exposed to a more computer-centric interactive experience in which video picture degradation may be acceptable.

In one type of constrained-resource-state, the downscaled video picture continues to be displayed as a motion picture while some of the displayed graphical and textual objects may remain stationary for longer periods of time. In this scenario, the human visual system has less acuity on the downscaled video than on the original picture resolution. Furthermore, the human visual system tends to be less discerning of image artifacts in motion pictures because the sensing of an image at the retina occurs during a short and finite time interval and is replenished by new images at the moving picture rate. Therefore, the artifacts on graphical and textual objects tend to be more discernable than those of picture artifacts.

Prioritization Scheme Modes

Media engine 80 (FIG. 3) and video processing system 120 (FIG. 4) may operate either in an unconstrained resource state or in any of a number of possible constrained resource states. The memory controllers 98 & 138 contained in media engine 80 and video processing system 120, respectively, are configured to implement predetermined prioritization schemes that correspond to respective resource states of media engine 80 and video processing system 120, and that assign priority to each functional component or process that accesses the media memories 60 and 150, respectively. Therefore, a memory controller can indirectly control the bus bandwidth entitlement to each media-producing or media-consuming operation. In order to fulfill a request by a higher-priority operation, a memory controller may effect the postponement of a lower-priority data transfer operation. Each prioritization scheme may be used by a memory controller to assign data bus access priorities for one or more components. As a non-limiting example, media engine 80 components for which a data bus access priority may be assigned include: video decoder 81, audio decoder 82, DENC 84, FIFOs 91–97, and blitter 99.

Some of the functional components that consume media memory bus bandwidth are capable of performing different types of operations that may have different assigned priorities. For instance, the blitter 99 is capable of transferring data from one section of media memory 60 to another section of media memory 60 or from media memory 60 to system memory 49. These two types of blitter operations may, for example, be assigned lower priorities than a blitter data transfer operation from system memory 49 to media memory 60. Therefore, data bus access priority may be assigned based on an operation that is currently being performed by a component. The following are non-limiting examples of media engine 80 operations for which different priority schemes may be assigned: reading data from a video picture buffer, writing data to a compressed audio buffer, writing data to a compressed video buffer, reading data from a compressed audio buffer, reading data from a compressed video buffer, writing data to a video picture buffer, writing data to a display buffer, reading data from a display buffer, writing data to an alpha-blend plane buffer, writing data to an off-screen buffer, writing data to an audio buffer, reading data from an audio buffer, reading data from an off-screen buffer, and reading data from an alpha-blend plane.

The priority assignment map employed by a memory controller for operations that access a media memory, may vary in response to a state being experienced by the system. For example, a memory controller may exercise a first priority assignment map while in a non-constrained-resource-state and a second priority assignment map while in a constrained-resource-state. Each priority assignment map may be tailored for enhanced performance during the respective state, and may be either fixed or cyclical.

In a cyclical assignment map, the priority assignment for a type of operation may cycle through a set of values corresponding to intervals of the video signal and/or to the clock driving a DENC. The number of intervals within each cycle may be pre-determined and constant. A priority assignment corresponding to an interval in a cycle may be responsive to whether a constrained state is currently in effect. An operation may be effectively disabled within an interval by significantly lowering the respective priority level. Intervals in a cycle may include a vertical blanking interval (VBI), line-refresh intervals, and Horizontal-Synch intervals. As a non-limiting example, the memory controller may exercise a fixed priority assignment map during a non-constrained-resource-state and a cyclical priority assignment map while in a constrained-resource-state, or vice versa.

Figure 5:
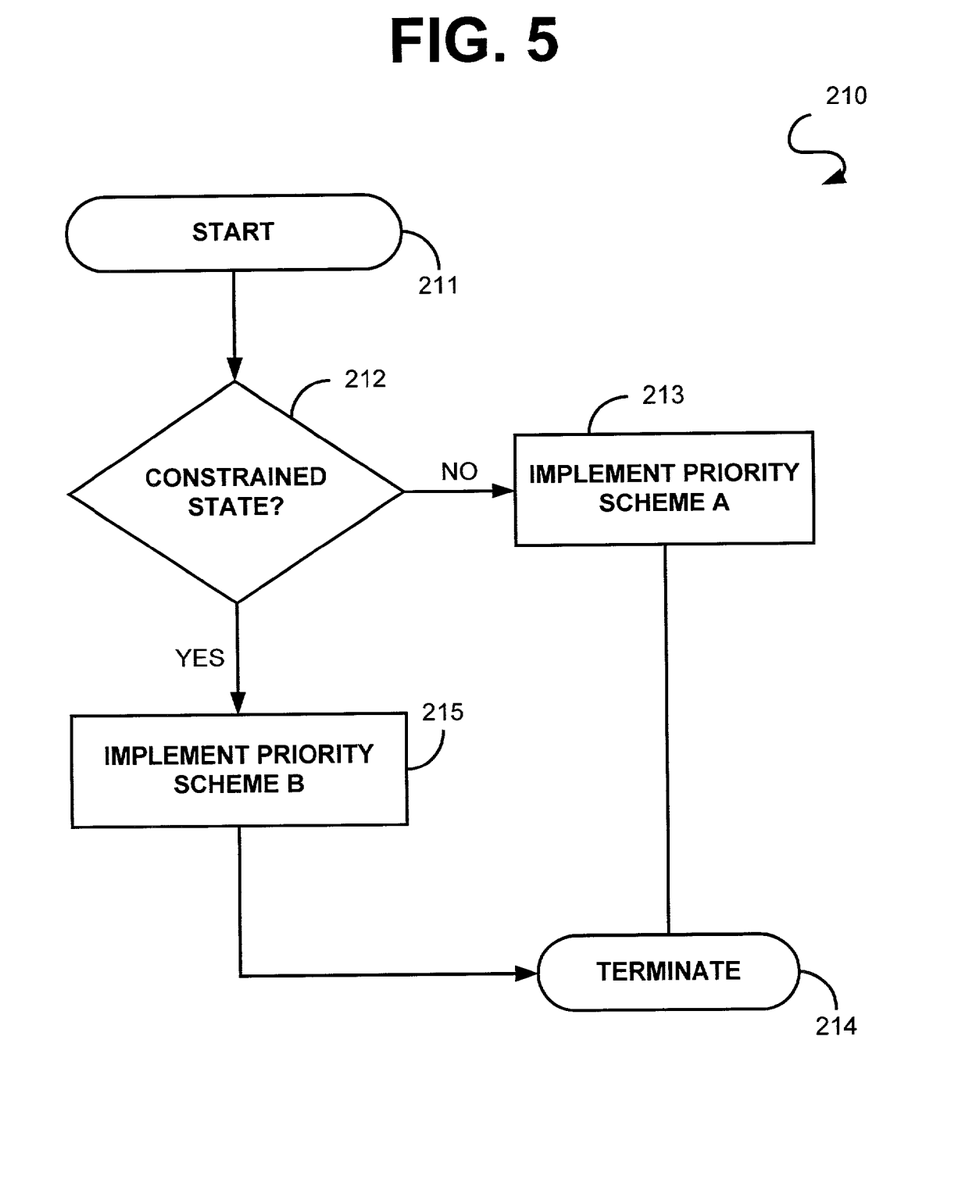
FIG. 5 is a flow chart illustrating an example of a prioritization modification routine that can be executed by the DHCT illustrated in FIG. 1 or the video processing system illustrated in FIG. 4.

FIG. 5 illustrates an example access priority adaptation routine 210 that can be implemented in DHCT 16 (FIG. 1) or video processing system 120 (FIG. 4). As with routine 230 discussed below, routine 210 may be executed by processor 44 of DHCT 16 or by CPU 132 of video processing system 120. After the routine is initiated, as indicated in step 211, it determines whether the system is currently experiencing a constrained-resource state, as indicated in step 212. If the system is not experiencing a constrained-resource state, then the system implements (or maintains) a first data bus access prioritization scheme (priority scheme A), as indicated in step 213, and the routine terminates, as indicated in step 214. However, if the system is experiencing a constrained-resource state, then the system implements another data bus access prioritization scheme (priority scheme B), as indicated in step 215, and the routine terminates, as indicated in step 214. The following are examples of priority schemes "A" and "B" for constrained and unconstrained states, respectively, wherein a lower number signifies a higher priority and vice versa.

TABLE 1

Examples Of Priority Schemes A & B

|  | Scheme "A" | Scheme "B" |
|---|---|---|
| reading from the video picture buffer(s) | 1 | 11 |
| reading from the display buffer | 1 | 1 |
| reading from the alpha-blend plane | 1 | 1 |
| reading from the audio buffer | 2 | 2 |
| writing to the compressed video buffer | 3 | 3 |
| writing to the compressed audio buffer | 4 | 4 |
| reading from the compressed audio buffer | 5 | 5 |
| writing to the audio buffer | 6 | 6 |
| reading from the compressed video buffer | 7 | 7 |
| writing to the video picture buffer(s) | 8 | 8 |
| writing to the alpha-blend plane | 9 | 9 |
| writing to the off-screen buffer | 10 | 10 |
| writing to the display buffer | 11 | 12 |

Priority scheme B improves the quality and reduces the latency of displayed graphical data by reducing the relative priority for the function of reading from the video picture buffers.

Figure 6:
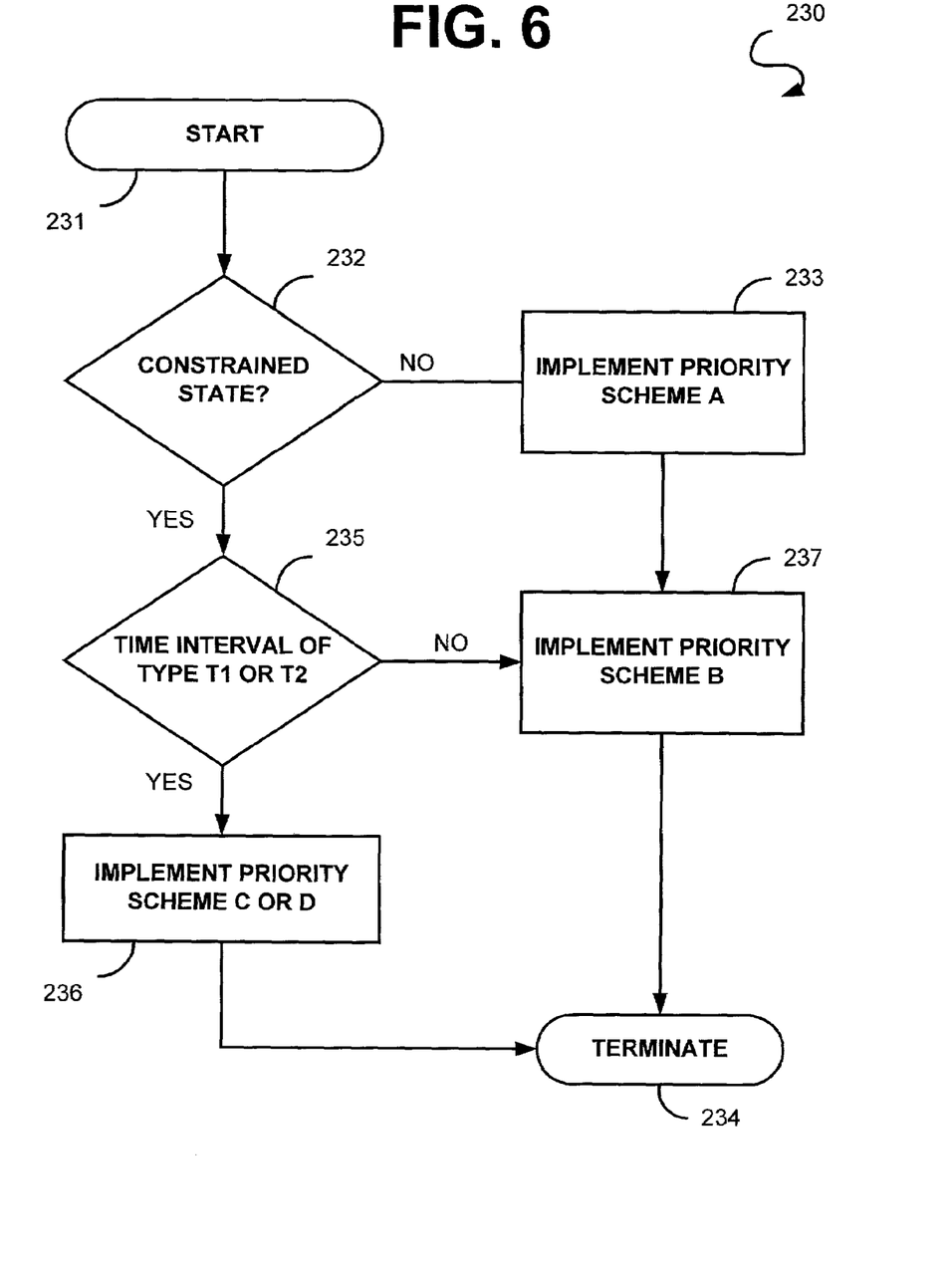
FIG. 6 is a flow chart illustrating another example of a prioritization modification routine that can be executed by the DHCT illustrated in FIG. 1 or the video processing system illustrated in FIG. 4.

FIG. 6 illustrates an example access priority adaptation routine 230 that can be implemented in DHCT 16 or video processing system 120. After the routine is initiated, as indicated in step 231, it determines whether a system is currently experiencing a constrained-resource state, as indicated in step 232. If the system is not experiencing a constrained-resource state, then the system implements (or maintains) a first data bus access prioritization scheme (e.g. priority scheme A), as indicated in step 233, and the routine terminates, as indicated in step 234. However, if the system is experiencing a constrained-resource state, then the routine determines whether the system is currently in a predetermined type of time interval T1 or T2, as indicated in step 235. If the system is currently in time interval T1 or T2, then the system implements data bus access prioritization scheme C or D, respectively, as indicated in step 236, and the routine terminates, as indicated in step 234. If the system is not currently in time interval T1 or T2, then the system implements (or maintains) a predetermined data bus access prioritization scheme (e.g. priority scheme B), as indicated in step 237, and the routine terminates, as indicated in step 234. Time intervals T1 and T2 may correspond, for example, to even vertical blanking intervals and intervals during which B pictures are being decoded, respectively. The following are non-limiting examples of priority schemes C, & D that may be used for time intervals T1 & T2, respectively, during a constrained state.

TABLE 2

Examples Of Priority Schemes C & D

|  | Scheme "C" | Scheme "D" |
|---|---|---|
| reading from the video picture buffer(s) | 11 | 11 |
| reading from display buffer | 1 | 1 |
| reading from alpha-blend plane | 1 | 1 |
| reading from audio buffer | 2 | 2 |
| writing to compressed video buffer | 3 | 3 |
| writing to compressed audio buffer | 4 | 4 |
| reading from compressed audio buffer | 5 | 5 |
| writing to audio buffer | 6 | 6 |
| reading from compressed video buffer | 7 | 8 |
| writing to video picture buffer(s) | 9 | 8 |
| writing to alpha-blend plane | 8 | 7 |
| writing to off-screen buffer | 8 | 7 |
| writing to display buffer | 8 | 7 |

Priority schemes C and D improve the quality and reduce the latency of displayed graphical data. Priority scheme C achieves this by increasing the relative priorities for the functions of reading the picture buffers, reading the alpha blend plane, and reading the display buffer. Priority scheme D, in addition to increasing the relative priorities for these three functions, also reduces the priority for reading the compressed video buffer.

Each of the above mentioned functions, processes, or applications comprise executable instructions for implementing logical functions and can be embodied in any computer-readable medium for use by or in connection with an instruction execution system, apparatus, or device, such as a computer-based system, a processor-containing system, or another system that can execute instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

It should be emphasized that the above-described embodiments of the present invention, particularly any "preferred embodiments", are merely possible examples, among others, of the implementations, setting forth a clear understanding of the principles of the inventions. Many variations and modifications may be made to the above-described embodiments of the invention without departing substantially from the principles of the invention. All such modifications and variations are intended to be included herein within the scope of the disclosure and present invention and protected by the following claims.

What is claimed is:

1. A method in a video decoding system for adapting to resource constraints, said method comprising steps of:
configuring a first resource access priority assignment to a plurality of resource consuming operations, each resource consuming operation being assigned a priority according to the first resource access priority assignment;
configuring a second resource access priority assignment that is different than the first resource access priority assignment to the plurality of resource consuming operations, each resource consuming operation being assigned a priority according to the second resource access priority assignment;

receiving a user input corresponding to performing a second media processing task, said second media processing task corresponding to a second amount of resource consumption, said user input being received while performing a first media processing task according to the first configured resource access priority assignment, said first media processing task corresponding to a first amount of resource consumption;

responsive to the user input determining whether a resource constrained mode is to be initiated to perform simultaneously the first and second media processing tasks; and responsive to determining that the resource constrained mode is to be initiated, initiating the resource constrained mode according to the second configured resource access priority assignment.

2. The method of claim 1, wherein the the first media processing task includes a first operation and the priority assigned to the first operation is different in the first and second resource access priority assignments, said first operation corresponding to an amount of consumption of a data bus.

3. The method of claim 2, wherein the first operation corresponds to at least one from the group consisting of: a processor, an audio decoder, a video digital encoder, a memory buffer, a data storage device, and a digital to analog converter.

4. The method of claim 1, wherein the priority assigned to a first operation is different in the first and second resource access priority assignments, said first operation corresponding to an amount of consumption of a data bus while performing a specific function.

5. The method of claim 4, wherein the specific function is selected from a group consisting of:

writing data to a compressed audio buffer, writing data to a compressed video buffer, reading data from a compressed audio buffer, reading data from a compressed video buffer, writing data to a video picture buffer, writing data to a graphical data buffer, reading data from a graphical data buffer, writing data to an alpha-blend plane buffer, writing data to an off-screen buffer, writing data to an audio buffer, reading data from an audio buffer, reading data from an off-screen buffer, and reading data from an alpha-blend plane.

6. The method of claim 1, wherein the resource constrained mode corresponds to performing a constrained version of the first media processing task simultaneously with the second media processing task.

7. The method of claim 1, wherein the determining step includes determining that the resource constrained mode is to be initiated responsive to inadequate memory availability to perform simultaneously the first and second media processing tasks.

8. The method of claim 1, wherein the determining step includes determining that the resource constrained mode is to be initiated responsive to inadequate bus bandwidth availability to perform simultaneously the first and second media processing tasks.

9. The method of claim 1, wherein the first operation corresponds to decoding video.

10. The method of claim 1, wherein the step of determining whether the resource constrained mode is to be initiated further responsive to receiving a first data describing a video being processed in the first media processing first task.

11. The method of claim 10, wherein the user input includes causing the video being processed to be output at a reduced spatial resolution.

12. The method of claim 10, wherein the user input includes causing graphics to be generated and output along with the video being processed.

13. The method of claim 1, wherein the second configured resource access priority assignment comprises alternating the priority of at least one resource consumption operation between a first priority and a second priority.

14. The method of claim 13, wherein the at least one resource consumption operation is assigned the first priority during intervals corresponding to each instance of a specific portion of an output video signal.

15. The method of claim 14, wherein the at least one resource consumption operation is assigned the second priority outside the intervals.

16. The method of claim 10, wherein the resource constrained mode is one of a plurality of resource constrained modes that can be initiated.

17. The method of claim 10, wherein the video being processed is encoded using a Motion Picture Experts Group (MPEG) encoding scheme.

18. The method of claim 1, wherein the second resource access priority assignment is responsive to a degree of resource constraint to perform simultaneously the first and second media processing tasks.

19. The method of claim 18, wherein the degree of resource constraint is determined in view of an amount of resource availability and an amount of additional resource needed.

20. The method of claim 19, wherein the resource constraint includes a memory constraint.

21. The method of claim 19, wherein the resource constraint includes a memory bus bandwidth constraint.

22. The method of claim 19, wherein the amount of resource constraint needed is determined at least according to at least one look-up table.

23. The method of claim 1, wherein the step of determining whether the resource constrained mode is to be initiated according to a history of resource need to perform the first media processing task.

24. The method of claim 1, wherein the step of determining whether the resource constrained mode is to be initiated is according to a history of resource need to perform the second media processing task.

25. The method of claim 1, wherein the step of determining whether the resource constrained mode is to be initiated is according to a history of resource need to perform simultaneously the first and second media processing tasks.

26. The method of claim 1, wherein the determining and initiating steps are performed by a processor in a digital home communication terminal.

27. The method of claim 1, wherein the initiating step includes continuing to present audio to a user at a regular rate and maintaining audio and video synchronization during the resource constrained mode.

28. The method of claim 1, further comprising a step of terminating the resource constrained mode responsive to determining adequate resource availability.

29. A video decoding system for adapting to resource constraints, said system comprising:

logic for configuring a first resource access priority assignment to a plurality of resource consuming operations, each resource consuming operation being assigned a priority according to the first resource access priority assignment;

logic for configuring a second resource access priority assignment that is different than the first resource access priority assignment to the plurality of resource consuming operations, each resource consuming operation being assigned a priority according to the second resource access priority assignment;

logic for performing a first media processing task according to the first configured resource access priority assignment, said first media processing task corresponding to a first amount of resource consumption;

logic for performing simultaneosly the first media processing task and a second media processing task according to the second configured resource access priority assignment, said second media processing task corresponding to a second amount of resource consumption; and logic for initiating a resource constrained mode according to the second configured resource access priority assignment for performing simultaneosly the first and second media processing tasks.

30. The system of claim 29, wherein the logic is further configured for determining whether the resource constrained mode is to be initiated responsive to inadequate memory availability.

31. The system of claim 29, wherein the logic is further configured for determining whether the resource constrained mode is to be initiated responsive to inadequate bus bandwidth availability.

32. A video decoding system for adapting to resource constraints, said system comprising:

logic for configuring a first resource access priority assignment to a plurality of resource consuming operations, each resource consuming operation being assigned a priority according to the first resource access priority assignment;

logic for configuring a second resource access priority assignment that is different than the first resource access priority assignment to the plurality of resource consuming operations, each resource consuming operation being assigned a priority according to the second resource access priority assignment;

logic for configuring at least one resource consumption operation in second configured resource access priority assignment with an alternating first priority and a second priority;

logic for performing a first media processing task according to the first configured resource access priority assignment, said first media processing task corresponding to a first amount of resource consumption; and logic for performing simultaneosly the first media processing task and a second media processing task according to the second configured resource access priority assignment, said second media processing task corresponding to a second amount of resource consumption.

33. The system of claim 32, wherein the logic is further configured for initiating a resource constrained mode according to the second configured resource access priority assignment for performing simultaneosly the first and second media processing tasks.

34. The method of claim 2, wherein the first operation corresponds to a data access operation by a processor.

* * * * *

UNITED STATES PATENT AND TRADEMARK OFFICE
CERTIFICATE OF CORRECTION

PATENT NO. : 6,996,838 B2
APPLICATION NO. : 09/879307
DATED : February 7, 2006
INVENTOR(S) : Rodriguez Page 1 of 1

It is certified that error appears in the above-identified patent and that said Letters Patent is hereby corrected as shown below:

1. Column 2, line 55, change "on" to --one--

2. Column 2, line 57, change "al" to --all--

3. Column 2, line 59, change "th" to --the--

Signed and Sealed this

Third Day of April, 2007

JON W. DUDAS
*Director of the United States Patent and Trademark Office*